US007128179B2

(12) United States Patent
Szymanski

(10) Patent No.: US 7,128,179 B2
(45) Date of Patent: Oct. 31, 2006

(54) FORK LIFT TRUCK WITH A LATERALLY REMOVABLE BATTERY BLOCK

(75) Inventor: Marek Szymanski, Kleinmeinsdorf (DE)

(73) Assignee: Still GmbH, Hamburg (DE)

( * ) Notice: Subject to any disclaimer, the term of this patent is extended or adjusted under 35 U.S.C. 154(b) by 118 days.

(21) Appl. No.: 10/686,013

(22) Filed: Oct. 15, 2003

(65) Prior Publication Data

US 2004/0135358 A1 Jul. 15, 2004

(30) Foreign Application Priority Data

Oct. 18, 2002 (DE) ................................ 102 48 657

(51) Int. Cl.
*B62D 21/00* (2006.01)

(52) U.S. Cl. ..................................... 180/68.5; 180/65.1

(58) Field of Classification Search ............... 180/65.1, 180/68.5, 908; 320/109; 414/522
See application file for complete search history.

(56) References Cited

U.S. PATENT DOCUMENTS

| | | | | |
|---|---|---|---|---|
| 3,086,618 | A | 4/1963 | Christiansen | |
| 3,708,028 | A * | 1/1973 | Hafer | 180/65.1 |
| 5,187,423 | A * | 2/1993 | Marton | 320/109 |
| 5,806,948 | A * | 9/1998 | Rowan et al. | 312/293.3 |
| 6,085,854 | A * | 7/2000 | Nishikawa | 180/68.5 |
| 6,189,635 | B1 * | 2/2001 | Schuler et al. | 180/68.5 |
| 6,668,957 | B1 * | 12/2003 | King | 180/68.5 |
| 2005/0008465 | A1 * | 1/2005 | Szymanski et al. | 414/522 |

FOREIGN PATENT DOCUMENTS

| | | | |
|---|---|---|---|
| DE | 19641254 | * | 4/1998 |
| DE | 198 49 769 A1 | | 5/2000 |
| DE | 100 05 285 A1 | | 8/2000 |
| EP | 0 030 928 | | 6/1981 |
| JP | 9-82300 | | 3/1997 |
| JP | 10-36089 | * | 2/1998 |
| JP | 11-246193 | * | 9/1999 |
| JP | 2001-48493 | * | 2/2001 |
| JP | 2001-187698 | * | 7/2001 |
| JP | 2002-265191 | | 9/2002 |

* cited by examiner

*Primary Examiner*—Christopher P. Ellis
*Assistant Examiner*—Brian Swenson
(74) *Attorney, Agent, or Firm*—The Webb Law Firm

(57) ABSTRACT

A fork lift truck has a chassis and a battery block located inside the chassis. The chassis has a lateral opening for the removal of the battery block essentially in the horizontal direction. The chassis has a beam (5) to which a bending load can be applied and which is located on the upper side of the opening in the chassis. The beam can have an at least approximately T-shaped section.

17 Claims, 2 Drawing Sheets

FORK LIFT TRUCK WITH A LATERALLY REMOVABLE BATTERY BLOCK

CROSS REFERENCE TO RELATED APPLICATION

This application corresponds to German Application No. 102 48 657.3 filed Oct. 18, 2002, which is herein incorporated by reference in its entirety.

BACKGROUND OF THE INVENTION

1. Field of the Invention

This invention relates to a fork lift truck with a chassis and a battery block that can be positioned inside the chassis. The chassis has a lateral opening so that the battery block can be removed essentially in a horizontal, e.g., lateral, direction.

2. Technical Considerations

An electrically-powered fork lift truck of the general type described above is typically equipped with a battery block that contains storage batteries and provides the energy required for the traction drive system, the lifting drive system, and the other electrical units of the truck. To make it possible to replace the battery block, for example if it becomes damaged, the chassis of the fork lift truck is configured so that the battery block can be removed and a new battery block can be inserted by means of a suitable conveyor device. The battery block must typically be replaced frequently when the fork lift truck is used in multiple-shift operations. In that case, a discharged battery block in the fork lift truck is replaced regularly by a freshly charged battery block.

The chassis of some fork lift trucks is designed so that the battery block can be removed upwardly by a crane. One disadvantage of this arrangement is that the components that are located above the battery block, generally the driver's cab and the protective roof over the driver, must be able to pivot at least to some extent to make it possible to hoist the battery block.

On fork lift trucks that have a lateral opening for the removal of the battery, a roller conveyor can be located inside the fork lift truck on the floor of the battery compartment. Using this roller conveyor, which is permanently installed inside the fork lift truck, the battery block can be pushed in the horizontal (i.e., lateral) direction onto an external roller conveyor that is located next to the fork lift truck. To provide the chassis of the fork lift truck with the required rigidity in spite of the large lateral opening for the battery block, it is known that a structural section that runs underneath and alongside the opening can be provided to support the weight of the battery block. A fork lift truck of this type is described in DE 100 05 285 A1, for example. One disadvantage of this arrangement is that the roller conveyors are absolutely essential to change the battery.

Therefore, it is an object of this invention to design a fork lift truck so that a pallet truck, for example, can be placed underneath the battery block located in the fork lift truck and the battery block can be lifted and removed through the lateral opening of the chassis without the need for a permanently mounted conveyor in the truck.

SUMMARY OF THE INVENTION

The invention teaches that the chassis of the fork lift truck can have a beam that is located on the upper side of the opening in the chassis and to which a bending load can be applied. The beam, which can be oriented essentially horizontally in the longitudinal direction of the fork lift truck, imparts sufficient rigidity to the chassis, whereby the beam is subjected primarily to a bending load. The beam thereby forms the upper edge of the opening in the chassis. Because the beam is located above the battery compartment, the space underneath the battery block remains free of load-bearing chassis components. As a result, it is possible to lift the battery block and to extract it using a pallet truck that is pushed under the fork lift truck and is supported on load-bearing wheels or rollers.

In one advantageous development of the invention, the beam is shaped so that it extends to the front of the opening in the chassis. The beam thereby makes a transition from the horizontal segment on the upper side of the opening (e.g., extending fore and aft) into an essentially vertical segment (e.g., extending downwardly). The vertical segment thereby forms the forward edge of the opening in the chassis.

It is also advantageous if the beam is shaped so that it extends to the rear side of the opening in the chassis. Here again, in the essentially vertical segment of the beam (with respect to the fork lift truck), it forms the rear edge of the opening in the chassis.

The chassis of the fork lift truck can be at least partly open on the bottom in the vicinity of the battery block. The opening in the chassis can thereby be sized so that the forks of a pallet truck used for the transport of the battery block can come into direct contact with the battery block. Likewise, the chassis can have contact and support points in the area underneath the battery block, by means of which the weight of the battery block can be transmitted to the frame.

In one advantageous configuration, the beam can be rigidly connected in the forward area with a receptacle for a front axle of the fork lift truck. Forces and moments that originate in the front axle can thereby be transmitted directly into the beam. The beam can be rigidly connected with the receptacle, e.g., by welding or threaded fasteners. It is also possible to configure the beam and the receptacle for the forward axle in the form of a single component, i.e., in one piece.

It is additionally advantageous if the beam is rigidly connected in the rear area with a rear counterweight of the fork lift truck. The beam can be connected directly with a cast iron rear counterweight by means of a threaded fastener. The forces acting on the beam can thereby be transmitted directly into the rear counterweight.

A high flexural strength of the beam with the simultaneous use of a small amount of material can be achieved if the beam has an at least approximately T-shaped profile.

The same advantages can be achieved if the beam is at least partly in the form of a hollow section.

BRIEF DESCRIPTION OF THE DRAWINGS

Additional advantages and features of the invention are described in greater detail below with reference to the exemplary embodiments illustrated in the accompanying schematic figures in which like reference symbols identify like parts throughout.

DESCRIPTION OF THE PREFERRED EMBODIMENTS

Figure 1:
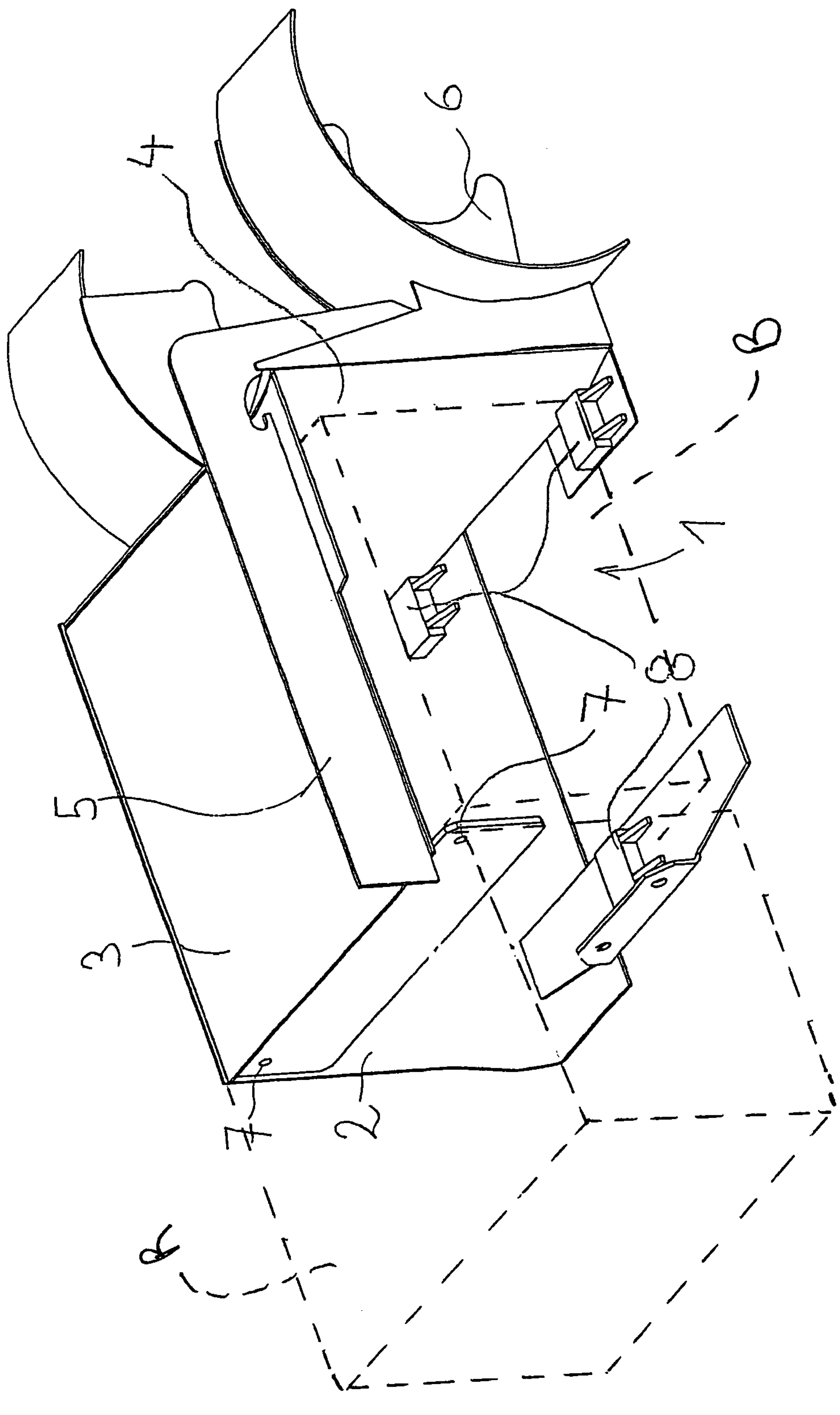
FIG. 1 is a perspective view of the chassis of a fork lift truck incorporating features of the invention.

FIG. 1 is a perspective view of the chassis of a fork lift truck incorporating features of the invention. FIG. 1 shows the battery compartment 1, which is open on the bottom and on a side, e.g., the right side of the fork lift truck in the figure. On the left side of the fork lift truck, the battery compartment 1 is delimited by one side wall 2 of the chassis. Toward the top, the battery compartment 1 is delimited by a plate 3, and toward the front by an additional plate 4. As will be appreciated, directional terms, such as "left", "right", "vertical", "horizontal", "top", "bottom", "front", "rear", and the like, used in the specification and claims refer to the invention as it is shown in the drawing figures. However, it is to be understood that the invention can assume various other orientations and, thus, such terms are not to be considered as limiting.

To give the chassis a desired rigidity, e.g., sufficient rigidity for typical industrial uses, the invention teaches that a beam 5 that extends in the longitudinal direction of the fork lift truck is located directly above the battery compartment 1 on its open side (i.e., the right side in the illustrated embodiment). The beam 5 can be the primary load-bearing chassis component on the open side (right side) of the fork lift truck and can be used to transmit forces and moments between the front and the rear sections of the fork lift truck. In its forward area, the beam 5 can be curved downwardly and can run along (e.g., can contact) the front plate 4 of the battery compartment 1. The beam 5 can be rigidly connected in the forward area with a receptacle 6 for the front axle of the fork lift truck. In the rear area, the frame, and thus also the beam 5, directly or indirectly can be rigidly connected with the rear counterweight R of the fork lift truck, for which purpose, in the illustrated exemplary embodiment, threaded holes 7 are provided.

The battery compartment 1, which is open on the bottom, makes it possible to change a battery block B by running a pallet truck underneath the battery compartment 1, lifting the battery block, and moving it out of the battery compartment 1. The procedure for inserting a new battery block is in the reverse order. As the battery block is being removed or inserted, the forks of the pallet truck are located between the contact points 8 that are located on the chassis. The battery block can sit on these contact points during the operation of the fork lift truck.

Figure 2:
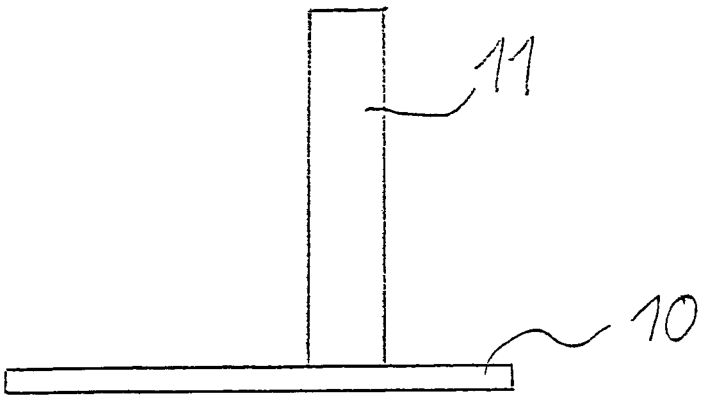
FIGS. 2 to 4 illustrate different variants for the cross section of a beam of the invention.
Figure 3:
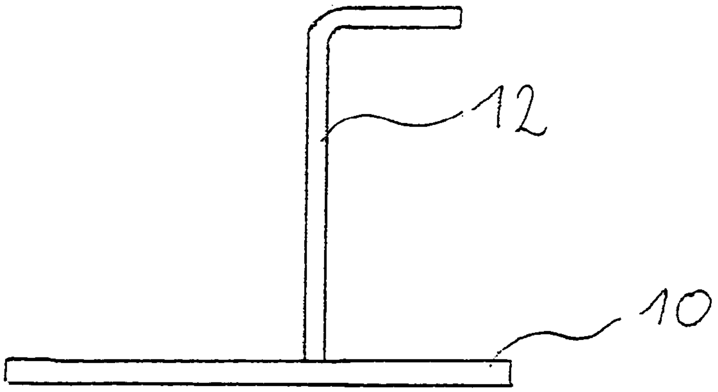
Figure 4:
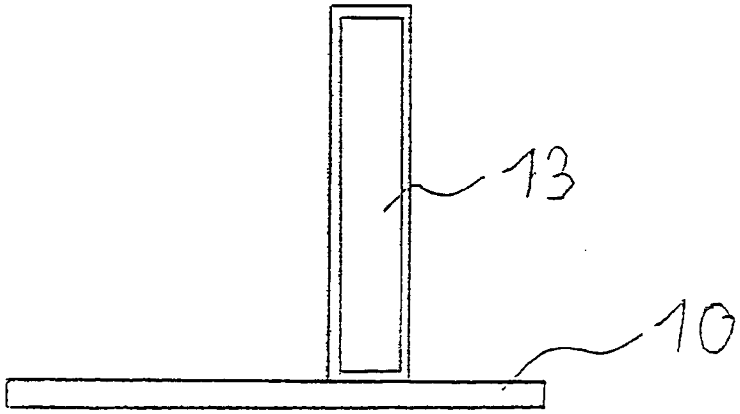

FIGS. 2–4 show a number of exemplary configurations of the cross section of the beam 5. The cross section shapes are thereby selected so that the beam 5 has a high section modulus in torque around a horizontal or vertical axis. At the same time, it is advantageous to manufacture the beam 5 using the smallest possible amount of material which, in turn, makes it more economical. In the application in the form of a beam, the cross sections described below can be used in the illustrated orientation or they can also be rotated, e.g., by 180 degrees.

In the variant illustrated in FIG. 2, the beam has a T-shaped profile and includes a first (horizontal) metal plate 10 and a second (vertical) metal plate 11 that is attached perpendicular to it. The two metal plates 10, 11 can be welded to each other, for example.

The variant illustrated in FIG. 3 also includes a first (horizontal) metal plate 10 and a second metal plate 12 that is attached perpendicular to it. Although, on the end farther from the metal plate 10, the metal plate 12 makes a transition to the horizontal (e.g., an end portion extends substantially perpendicular to the rest of the metal plate 12).

In the variant illustrated in FIG. 4, instead of a vertical metal plate, there is a hollow section 13 which is placed on a horizontal (e.g., flat) metal plate 10.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A fork lift truck, comprising:

a chassis; and a battery block inside the chassis, wherein the chassis has a lateral opening for removal of the battery block in a substantially lateral direction, wherein the chassis includes a beam to which a bending load can be applied and which beam is located on an upper side of the lateral opening in the chassis, wherein the chassis is at least partly open on the bottom underneath the battery block, wherein the space underneath the battery block is at least partly free of load-bearing chassis components, wherein contact points for the battery block are located on the chassis underneath the battery block, and wherein the space between a forward contact point and a rear contact point is free of load-bearing chassis components.

2. The fork lift truck as claimed in claim 1, wherein a rear portion of the beam is connected directly with a rear counterweight of the fork lift truck.

3. The fork lift truck as claimed in claim 1, wherein the beam has an at least approximately T-shaped section.

4. The fork lift truck as claimed in claim 1, wherein the beam includes at least one hollow section.

5. The fork lift truck as claimed in claim 1, wherein a forward portion of the beam is rigidly connected with a receptacle for a front axle of the fork lift truck.

6. The fork lift truck as claimed in claim 5, wherein a rear portion of the beam is rigidly connected with a rear counterweight of the fork lift truck.

7. The fork lift truck as claimed in claim 1, wherein the beam is shaped so that it extends to a rear side of the opening in the chassis.

8. The fork lift truck as claimed in claim 7, wherein the chassis is at least partly open on the bottom in a vicinity of the battery block.

9. The fork lift truck as claimed in claim 7, wherein a forward portion of the beam is rigidly connected with a receptacle for a front axle of the fork lift truck.

10. The fork lift truck as claimed in claim 7, wherein a rear portion of the beam is rigidly connected with a rear counterweight of the fork lift truck.

11. The fork lift truck as claimed in claim 1, wherein the beam is shaped so that it extends to a front side of the opening in the chassis.

12. The fork lift truck as claimed in claim 11, wherein the beam is shaped so that it extends to a rear side of the opening in the chassis.

13. The fork lift truck as claimed in claim 11, wherein the chassis is at least partly open on the bottom in a vicinity of the battery block.

14. The fork lift truck as claimed in claim 11, wherein a forward portion of the beam is rigidly connected with a receptacle for a front axle of the fork lift truck.

15. The fork lift truck as claimed in claim 11, wherein a rear portion of the beam is rigidly connected with a rear counterweight of the fork lift truck.

16. The fork lift truck as claimed in claim 11, wherein the beam has an at least approximately T-shaped section.

17. The fork lift truck as claimed in claim 11, wherein the beam includes at least one hollow section.

* * * * *